United States Patent [19]

Lawson

[11] Patent Number: 4,490,073
[45] Date of Patent: Dec. 25, 1984

[54] MULTIPLE FLOWLINE CONNECTOR

[75] Inventor: John E. Lawson, London, England

[73] Assignee: Armco Inc., Middletown, Ohio

[21] Appl. No.: 326,329

[22] Filed: Dec. 1, 1981

[30] Foreign Application Priority Data

Nov. 27, 1981 [GB] United Kingdom ............... 8135808

[51] Int. Cl.³ ................ E21B 33/038; E21B 43/013;
F16L 1/04; F16L 35/00
[52] U.S. Cl. .................................. 405/169; 166/343;
166/344; 166/362; 285/26; 285/29
[58] Field of Search ............... 405/169, 195; 166/339,
166/340–344, 347, 362; 285/18, 26, 29, 137 A

[56] References Cited

U.S. PATENT DOCUMENTS

| | | | |
|---|---|---|---|
| 3,326,579 | 6/1976 | Fowler | 285/26 X |
| 3,339,632 | 9/1967 | Lewis | 166/6 |
| 3,347,312 | 10/1967 | Neilon | 166/341 X |
| 3,486,556 | 12/1969 | Burgess | 285/26 X |
| 3,551,005 | 12/1970 | Brun | 285/10 |
| 3,604,731 | 9/1971 | Petersen | 285/29 |
| 3,716,100 | 2/1973 | Nelson | 285/29 X |
| 3,840,071 | 10/1974 | Baugh et al. | 285/26 X |
| 4,170,266 | 10/1979 | Fayren | 175/7 |
| 4,182,584 | 1/1980 | Panicker et al. | 405/195 |
| 4,219,223 | 8/1980 | Schulte | 285/26 |
| 4,319,637 | 3/1982 | Wilson | 285/26 X |
| 4,367,055 | 1/1983 | Gentry et al. | 405/169 |
| 4,371,291 | 2/1983 | Morrill et al. | 405/169 |

Primary Examiner—Cornelius J. Husar
Assistant Examiner—Nancy J. Stodola
Attorney, Agent, or Firm—Roylance, Abrams, Berdo & Goodman

[57] ABSTRACT

A connector for coupling a plurality of flowlines in a catenary bundle in fluid-flow relationship with a plurality of wellheads supported on a submerged buoyant support. The connector comprises a first member that is rigidly coupled to the submerged support, has a plurality of conduits extending therefrom to the wellheads, and has an open-ended member with a rotational orientation member therein; and a second member that is coupled to the end of the flowline bundle, is receivable on the first member and has an elongated stinger thereon receivable in the annular open-ended member on the first connector member. The stinger has a second orientation member for mating with the orientation member in the open-ended member. Run from the surface through the open-ended member and attached to the end of the stinger is a hauling wireline used to bring the first and second connector members into engagement, at which time they are rotationally oriented and locked together. In addition to the flowlines, the connector can couple control lines carried by the catenary bundle to the wellheads to actuate, e.g., valves thereon.

20 Claims, 8 Drawing Figures

MULTIPLE FLOWLINE CONNECTOR

FIELD OF THE INVENTION

The invention relates to a multiple flowline connector for connecting a bundle of flexible flowlines to a plurality of underwater oil or gas wellheads. These wellheads can be, for example, mounted on a submerged buoyant support.

BACKGROUND OF THE INVENTION

As the search for oil and gas deposits below the sea bed continues, exploration and production equipment are utilized in deeper and deeper waters. While subsea exploration has typically been conducted in waters having a depth less than 300 meters, exploration and production are now moving to depths greater than this. Systems are known for operating at such depths which include a submarine base on the sea bed, a plurality of risers extending upwardly from the base, a submerged buoyant structure coupled to the risers and keeping them in tension and a catenary flowline bundle coupled between the buoyant structure and a surface vessel. In this assembly, the production wellheads are conveniently mounted on the buoyant structure which is spaced below the surface of the water a sufficient depth, such as 50 meters, to avoid the problems of waves, winds, currents, vessels and storms. In addition, the buoyant structure can easily be reached by a diver if necessary. Examples of these systems are shown in U.S. Pat. Nos. 4,170,266 to Fayren and 4,182,584 to Panicker et al.

Although these systems are advantageous in very deep waters, various problems need to be overcome in order to use them for effective exploration and production. For example, a quick, accurate and repeatable connection of the catenary flowline bundle to the submerged buoyant structure is necessary. In addition, it is advantageous to couple control lines as well as the flowlines to the buoyant structure so that, for example, valves on the wellheads can be easily activated. Moreover, it is highly advantageous to connect the flowlines and control lines to the buoyant structure remotely without significant diver assistance.

While there are various prior art devices that deal generally with these problems, there is still room and need for improvement. Examples of these prior art devices are disclosed in U.S. Pat. Nos. 3,339,632 to Lewis; 3,551,005 to Brun; and 3,604,731 to Peterson, as well as the two patents cited above.

SUMMARY OF THE INVENTION

Accordingly, a primary object of the invention is to provide a connector that is quick, accurate and repeatable for coupling multiple flowlines to a submerged structure.

Another object of the invention is to provide such a connector that can also connect control lines from a surface vessel to a submerged structure to control wellheads thereon.

A further object of the invention is to provide a flowline connector that is remotely operable without significant diver intervention.

The foregoing objects are basically attained by providing a connector for coupling a plurality of flowlines in a catenary bundle in fluid-flow relationship with a plurality of wellheads supported on a submerged support, the combination comprising a first connector member rigidly coupled in a generally upright position to the submerged support and including a plurality of conduits extending therethrough having first and second ends, the conduits adapted to be coupled at their first ends to the plurality of wellheads, and a hollow annular member having first and second open ends and an orientation member on the interior thereof; a second connector member adapted to be coupled to the first connector member and including a plurality of conduits extending therethrough and having first and second ends, the conduits adapted to be coupled at their first ends to the second ends of the conduits in the first connector member and adapted to be coupled at their second ends to the plurality of flowlines in the catenary bundle, and an elongated stinger adapted to be received in the hollow annular member and having an orientation member on the exterior thereof for mating with the orientation member on the first connector member to orient the conduits on the first and second connector members into a fluid-flow relationship; a wireline extending through the hollow annular member in the first connector member and coupled to the stinger in the second connector member; a hauling device coupled to the wireline for hauling the wireline upwardly towards the surface of the body of water until the conduits on the first and second connector members are in a fluid-flow relationship; and a means for coupling the first and second connector members together with the conduits in fluid-flow relationship.

In addition, the foregoing objects are attained by a unique method of coupling a plurality of flowlines in a catenary bundle in fluid-flow relationship to a plurality of wellheads supported on a submerged support comprising the steps of supporting both ends of the catenary flowline bundle adjacent the surface of the body of water, running a wireline from the surface through an opening in the submerged support and to one end of the catenary bundle, connecting the wireline to the end of the catenary bundle, lowering the end of the catenary bundle connected to the wireline to a position underwater below the submerged support, and hauling the wireline through the opening and towards the surface until the end of the catenary bundle engages the submerged support and is in flow-flow relationship with the plurality of wellheads. In this method, the hauling step advantageously includes hauling the wireline generally upwardly and rotationally orienting the end of the catenary bundle relative to the opening in the submerged support. In addition, advantageously following the hauling step is the further step of releasably connecting to the submerged support the end of the catenary bundle engaging that support.

Further objects, advantages and salient features of the present invention will become apparent from the following detailed description which, taken in conjunction with the annexed drawings, discloses a preferred embodiment of the present invention.

DRAWINGS

Referring now to the drawings which form a part of this original disclosure:

FIG. 1 is a semi-diagramatic side elevational view of the connector in accordance with the invention with a first connector member rigidly coupled to a submerged structure carrying wellheads, a second connector member located near the surface of the body of water and coupled to the end of a catenary bundle extending from a surface vessel, and a wireline extending from a hauling crane on the vessel, through the first connector member and coupled to the second connector member;

Figure 1:
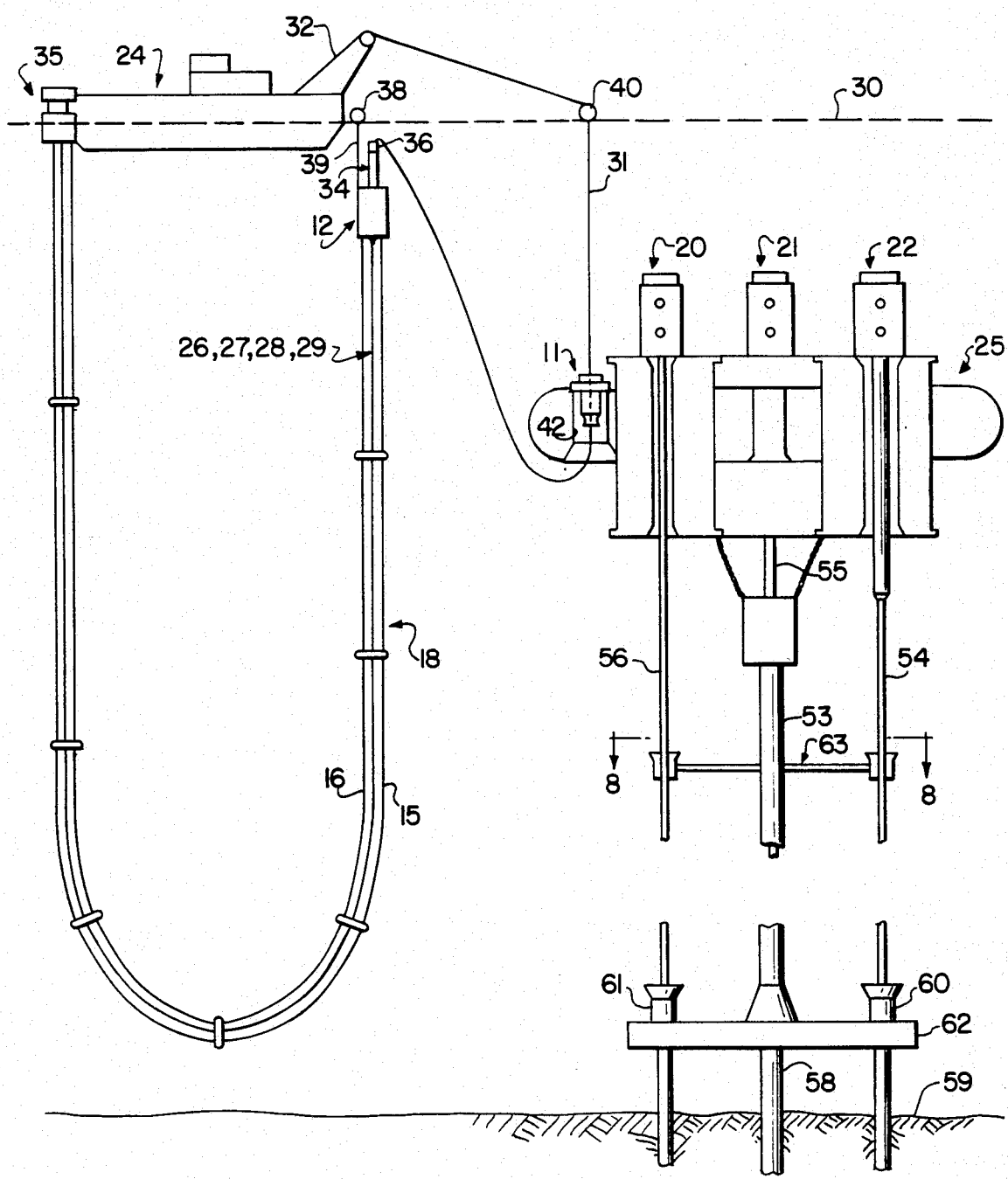
Figure 4:
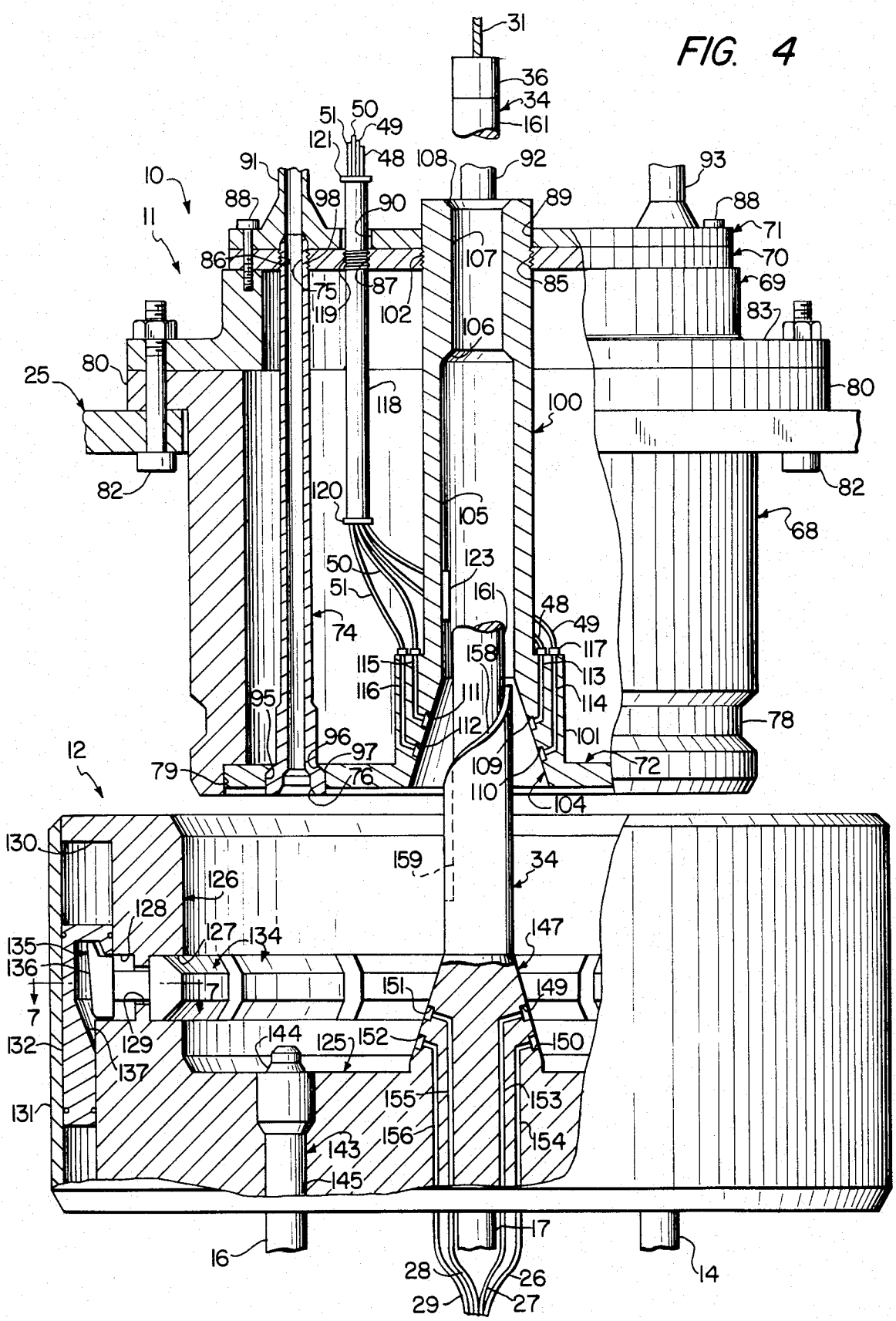
FIG. 4 is a semi-diagramatic side elevational view in partial section of the first and second connector members about to be coupled.
Figure 7:
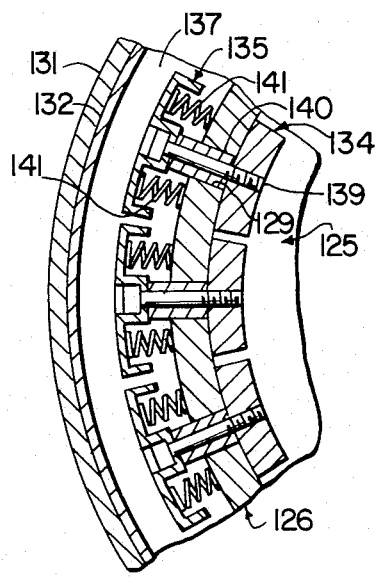
Figure 8:
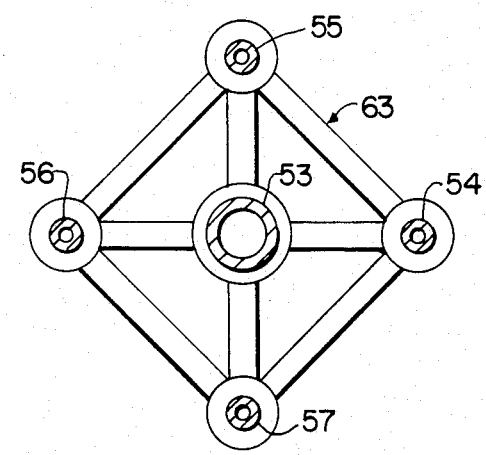

FIG. 7 is a fragmentary top plan view in section taken along lines 7—7 in FIG. 4 showing the locking segments used to rigidly couple the first and second connector members together, these locking segments being shown in their unlocked position; and FIG. 8 is a semi-diagramatic top plan sectional view taken along lines 8—8 in FIG. 1 showing a central column, four risers and their reinforcing structure which support the submerged structure between the surface and bed of the body of water.

DETAILED DESCRIPTION OF THE INVENTION

Figure 5:
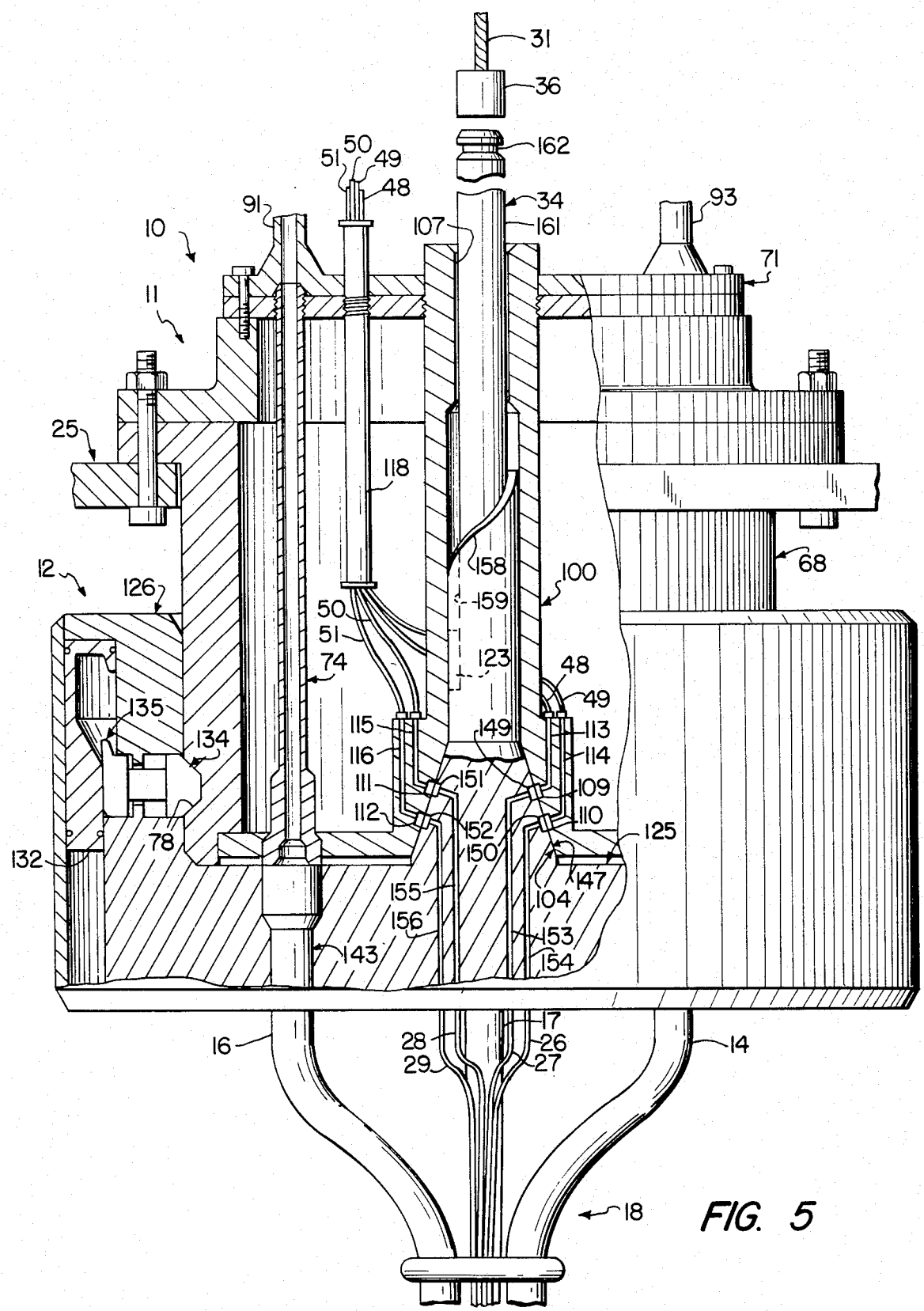
FIG. 5 is a semi-diagramatic side elevational view in partial section similar to that shown in FIG. 4 except that the second connector member is fully seated on the first connector member and these members are rigidly coupled together.

Referring now to FIGS. 1–7, the purpose of the invention is to provide a connector 10, including first and second engageable connector members 11 and 12, to couple a plurality of flowlines 14–17 in a catenary bundle 18 to a plurality of wellheads 20–23, with an end of the catenary bundle being coupled to a surface vessel 24 and with the wellheads being mounted on a submerged buoyant structure 25. The first connector member 11 is mounted on the submerged structure and is in a fluid-flow relationship with the wellheads. The second connector member 12 is mounted on the end of the bundle and is in a fluid-flow relationship with the flowlines. As will be described in more detail hereinafter, the catenary bundle can also include control lines to be coupled from the surface vessel to the wellheads to actuate various wellhead devices such as valves. Four of these control lines 26–29 in the catenary bundle are shown in FIGS. 1, 4 and 5.

Figure 2:
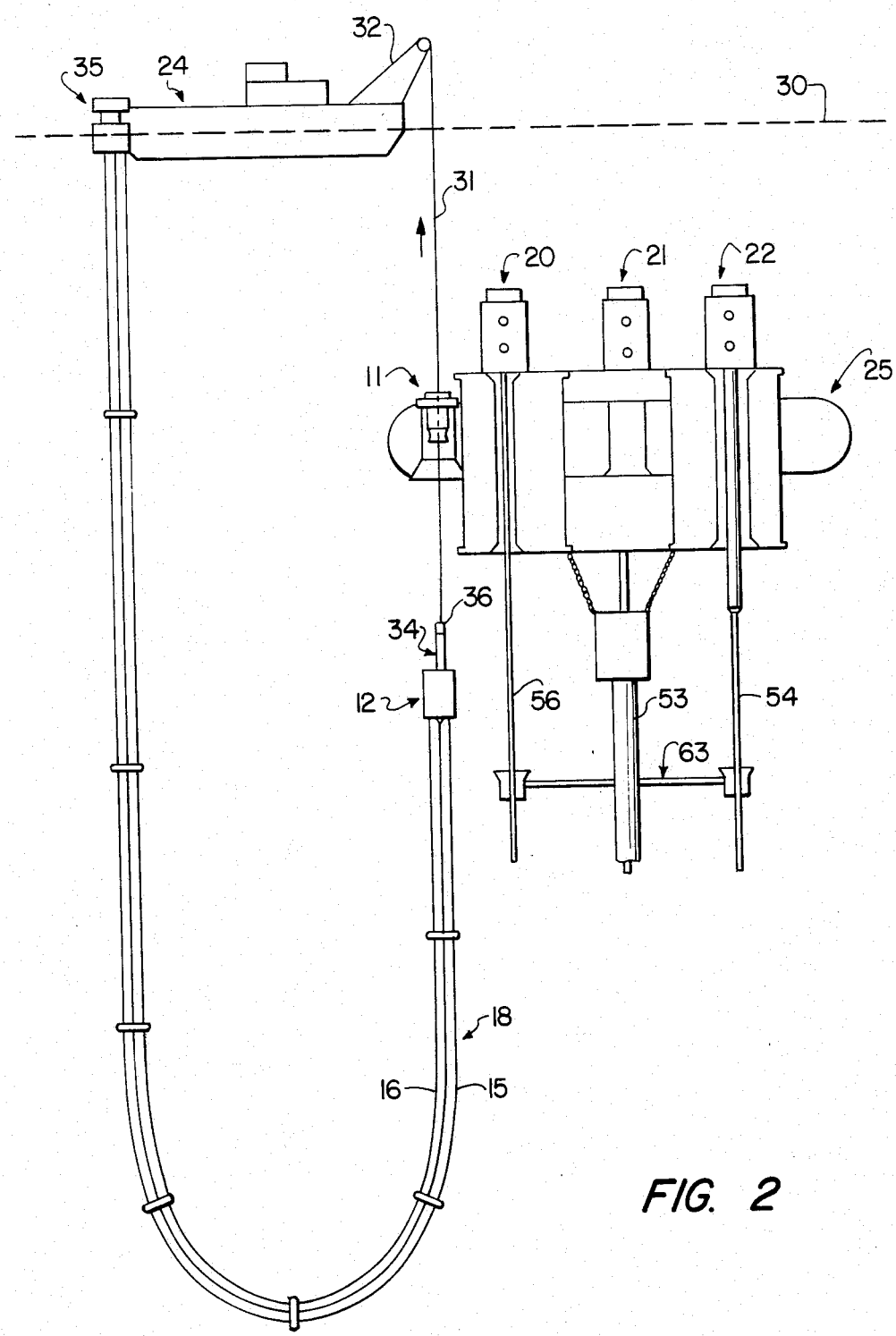
FIG. 2 is a semi-diagramatic side elevational view similar to that shown in FIG. 1 except that the second connector member has been lowered from the surface to a position below the submerged structure and the wireline is hauling the second connector member upwardly towards the surface.

Basically, this coupling of the first and second connector members 11 and 12 is accomplished by hauling the second connector member 12 generally upwardly towards the surface 30 of a body of water into engagement with the first connector member 11 by means of a hauling wireline 31 coupled at one end to a crane 32 on the surface vessel 24 and at the other end to a stinger 34 on the second connector member. This upward movement of the second connector member is shown in FIG. 2 with the wireline 31 extending through the first connector member 11. Upon entry of the stinger 34 into the first connector member 11, the first and second connector members are rotationally oriented to provide a fluid-flow relationship between the respective flowlines and the respective wellheads through the connector. Then the connector members are rigidly coupled together.

Referring now to FIG. 1, the surface vessel 24 can include a production facility and has a conventional single-point mooring buoy 35 coupled at one end to allow relative rotation therebetween. An end of the catenary bundle 18 is suitably secured in fluid-flow relationship to the single-point mooring buoy.

The catenary flowline bundle 18 is formed from flexible hoses which comprise the four flowlines 14–17 and the four control lines 26–29 suitably coupled together to form the bundle. These flowlines and control lines are suitably coupled in a conventional manner to the bottom of the second connector member 12 as seen generally in FIGS. 1–3 and in detail in FIGS. 4 and 5. Thus, the second connector member 12 is at an end of the catenary bundle opposite from the single-point mooring buoy.

Figure 3:
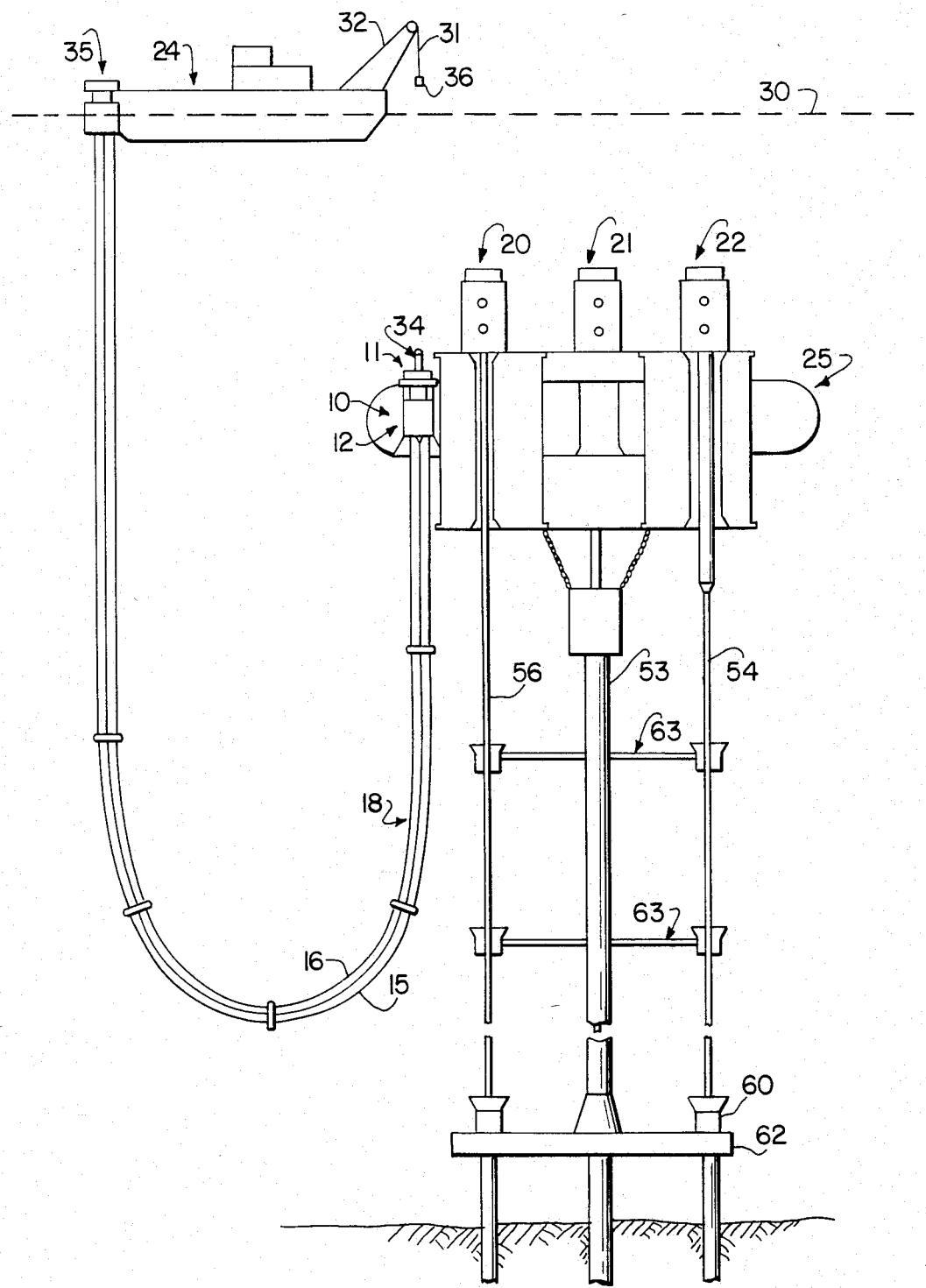
FIG. 3 is a semi-diagramatic side elevational view similar to that shown in FIG. 2 except that the second connector member has engaged and is rigidly coupled to the first connector member on the submerged structure and the wireline has been disconnected from the second connector member.

As seen in FIGS. 1–3, the end of stinger 34 is releasably coupled to the free end of the wireline 31 via a conventional releasable coupling 36.

As seen in FIG. 1, the end of the catenary bundle having the second connector member thereon is located adjacent the surface 30 by means of a pilot buoy 38 on the surface having a line 39 extending therefrom to the connector member. Alternatively, the second connector member 12 could be directly supported by the surface vessel 24 or a separate vessel. In addition, the wireline 31 is releasably coupled to a second pilot buoy 40 to aid in orienting the wireline above the submerged structure 25. Depending upon the location and use of the surface vessel 24 relative to the support structure, this pilot buoy 40 could be eliminated or replaced with an additional vessel.

Figure 6:
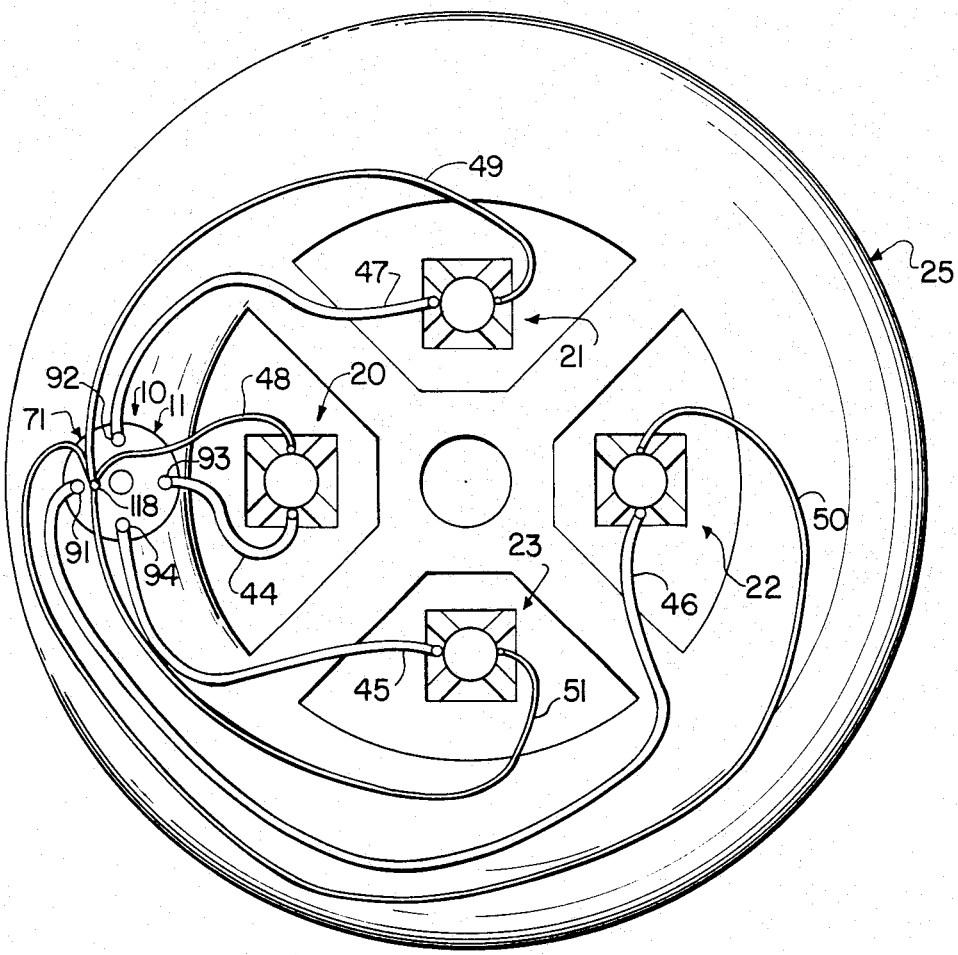
FIG. 6 is a semi-diagramatic top plan view of the submerged structure shown in FIG. 1 illustrating four wellheads with four flowlines and four control lines extending from the connector to the wellheads.

As seen in FIGS. 1 and 3, the submerged buoyant structure or support 25 has four wellheads thereon and also has the first connector member 11 rigidly coupled thereto in a generally upright opening 42 in the structure. As seen in FIGS. 1 and 6, the first connector member 11 is oriented itself in a generally upright position and is spaced radially outwards of the four wellheads 20–23. These wellheads are substantially equally circumferentially spaced from one another and are equally radially spaced from the center of the structure 25. This structure can be circular and is buoyant.

As seen in FIG. 6, four external flowlines 44–47 extend in fluid-flow relationship from the first connector member 11 to the wellheads 20–23, respectively. In addition, four control lines 48–51 extend in fluid-flow relationship from the first connector member to wellheads 20–23, respectively.

Referring again to FIG. 1 and to FIG. 8, the submerged structure 25 is coupled to a central column 53 as well as four risers 54–57, the central column extending into a central pile 58 in the bed 59 of the body of water and the four risers extending into four wells, only two of which are shown in FIG. 1 and labeled as 60 and 61, which extend down into the earth below bed 59. Substantially at the junction of the central column and central pile and the risers and wells is a submarine base 62. Since the submerged structure 25 is buoyant, it will maintain the risers and central column in tension to keep the entire structure generally upright. As seen in FIGS. 1–3 and 8, a plurality of reinforcing assemblies 63 are used to keep the risers and the central column in the desired orientation.

Referring now to FIGS. 4 and 5, the first and second connector members 11 and 12 forming the connector 10 of the invention are shown in detail.

The first connector member 11 forms the male part of the connector and comprises an open-ended annular main body 68, a support ring 69, an upper plate 70, a cover plate 71 and a lower plate 72. Four internal flowline conduits, only one of which is shown and labeled 74, extend through the first connector member 11, each having a first end 75 at the top of the connector member and a second end 76 at the bottom of the connector member. These internal flowline conduits conduct fluid through the first connector member with the first ends in fluid-flow relationship with flowlines 44-47 and thus the wellheads and the second ends in fluid-flow relationship with conduits in the second connector member 12.

The main body 68 has an outwardly facing annular locking groove 78 near the bottom, a cylindrical counterbore 79 at the bottom in which the lower plate 72 is received and an outwardly extending flange 80 at the top. Bolts 82 extend through a deck portion of the submerged structure 25 and into flange 80 to rigidly secure the first connector member to the structure in a generally upright position and inside opening 42 in structure 25, as seen in FIG. 1.

The support ring 69 has an outwardly extending flange 83 which also receives bolts 82 to rigidly couple the support ring to the main body.

The circular upper plate 70 sits on top of the support ring 69 and has a central threaded bore 85, four radially outwardly spaced threaded bores to receive each of the internal flowline conduits, only one labeled 86 being shown, and a third threaded bore 87 interposed radially between bores 85 and 86 as shown in FIG. 4. The four threaded bores for receiving the internal flowline conduits are equally circumferentially spaced at 90° intervals.

The circular cover plate 71 sits on top of upper plate 70 and has a plurality of bolts 88 passing therethrough, through upper plate 70 and into ring 69 to secure the ring and these two plates together. The cover plate 71 has a central bore 89 coaxially aligned with bore 85 in plate 70, a second bore 90 coaxially aligned with threaded bore 87 in plate 70, and four open ended hubs extending upwardly and rigidly therefrom and in fluid-flow connection with the internal flowline conduits in the first connector member. As seen in FIGS. 4 and 6, these hubs have character numerals 91-94 and are suitably connected in a fluid-flow relationship with external flowlines 44-47 leading to the wellheads, as seen best in FIG. 6.

The circular lower plate 72 has four circumferentially spaced bores to receive the second ends of the internal flowline conduits, only one being shown which is labeled 95 and which receives internal flowline conduit 74. This bore 95 has an upwardly and inwardly tapering frustoconical surface 96 which abuts against a similar upwardly and inwardly tapering frustoconical surface 97 on an enlarged part of conduit 74. At the other end of the conduit 74 is an external threaded portion 98 which is threadedly engaged in threaded bore 86 in upper plate 70.

Extending upwardly from the center of circular plate 72 is an open ended, hollow annular member 100 which is rigidly coupled to the plate 72 and which has an enlarged cylindrical boss 101 at the base and an external threaded portion 102 near the distal end. Portion 102 is threadedly engaged in threaded bore 85 in plate 70, the area of annular member 100 above threaded portion 102 being received in bore 89 in plate 71. The hollow interior of annular member 100 is formed in ascending order as an upwardly and inwardly tapering frustoconical surface 104, a cylindrical surface 105, a short upwardly and inwardly tapered frustoconical surface 106, a cylindrical surface 107 and a downwardly and inwardly tapered frustoconical surface 108. Frustoconical surface 104 defines a socket on the inside of boss 101 and has four ports 109-112 therein with ports 109 and 110 being on one side of the socket and ports 111 and 112 being on the other side. These ports are in fluid-flow communication with four ducts 113-116, respectively, formed in boss 101 which are in turn in fluid-flow relationship with the four control lines 48-51 via four conventional fittings 117. These control lines 48-51 are made up into a bundle enclosed in a tube 118. This tube is supported on the first connector member by means of an externally threaded portion 119 thereon which is threadedly received in threaded bore 87 in plate 70 and extends upwardly through bore 90 in plate 71. At opposite ends of tube 118 are a pair of flexible retainers 120 and 121 which are rigidly received in these ends and have the control lines passing therethrough. As seen in FIG. 6, the first ends of ducts or internal conduits 113-116 are connected to control lines 48-51 which are connected to the wellheads. The second ends of these ducts are in effect formed by ports 109-112 in surface 104.

Located rigidly on the interior of annular member 100 and extending inwardly from cylindrical surface 105 is an orientation member in the form of a locator or alignment key 123 which is rectangular in cross-section.

Still referring to FIG. 4, the second female connector member 12 is in the form of a female part of connector 10 and includes a disk-shaped base 125, an upwardly extending outer cylindrical wall 126 and the stinger 34 extending rigidly upwardly from base 125 and centrally thereof. This stinger 34 is rigidly connected to the base by being integrally formed therewith or by being separately formed and suitably rigidly coupled thereto. Wall 126 has an inwardly facing inner groove 127 of substantially rectangular cross-section, an outwardly facing outer groove 128 having a substantially rectangular cross-section and being aligned opposite the inner groove, and a plurality of bores 129 interconnecting these grooves. An enlarged recess 130 is formed on the outside of wall 126 which is closed by an outer ring 131 suitably coupled to the wall. Longitudinally movable under suitable hydraulic action along the recess 130 is a camming ring 132. Slidably received in inner annular groove 127 are a plurality of locking segments and slidably received in outer annular groove 128 are a plurality of cam follower segments 135 with downwardly and inwardly tapered frustoconical surfaces 136 on the exterior thereof. These surfaces 136 are in camming engagement with internal downwardly and inwardly frustoconical surface 137 on camming ring 132. As seen in FIGS. 4 and 7, each cam follower segment 135 and locking segment 134 are coupled by a bolt 139 passing through a hollow tube 140 interposed between segments 134 and 135. These segments are spring-biased in the radially outward direction as seen in FIG. 7 by means of coiled springs 141, two being used for each segment 135. As seen in FIG. 7, the coiled springs bias against the inside of follower segments 135 and the inner wall of outer groove 128.

The locking segments 134 in conjunction with the cam follower segments 135 and the camming ring 132 form a coupling device to rigidly couple the second connector member 12 to the first connector member 11, with the locking segments 134 being releasably receivable in groove 78 in the first connector main body 68. This releasable coupling device is conventional and is disclosed in more detail in U.S. Pat. No. 3,228,715 to Neilon et al; the disclosure of which is hereby incorporated by reference. As shown in FIG. 4, the locking segments are in their withdrawn unlocked position, while in FIG. 5 they are shown in their radially inwardly extended locked position.

Referring again to FIG. 4, the second connector member 12 has four internal flowline conduits extending therethrough, only one of which is shown in FIG. 4 and labeled 143. Each of these conduits has a first end 144 adapted to be coupled to the second ends of the flowline conduits in the first connector member and a second end 145 adapted to be coupled to the plurality of flowlines 14–18 in the catenary bundle. These flowlines 14–18 are suitably coupled to the conduits in any desired fashion or could be integrally formed therewith. As seen in FIG. 4, the first end 144 of conduit 143 is in the form of a projecting hub which will be received in the second end 76 of conduit 74 in the first connector member. Each of the four flowline conduits in the second connector member are equally circumferentially spaced so as to be in fluid-flow relationship with the flowline conduits in the first connector member once they are rotationally oriented.

At the bottom of stinger 34 in the second connector member is an upwardly and inwardly tapered frustoconical surface 147 which defines a projecting hub that is receivable in the socket defined by frustoconical surface 104 in the first connector member. The angle of taper of the socket and the hub is the same to provide a precise mating. Extending inwardly from the outer frustoconical surface 147 are four ports 149–152 arranged so that they can respectively register with ports 109–112 in surface 104 when surfaces 147 and 104 are seated together. Extending from these ports are four ducts 153–156, respectively, which form internal control line conduits and which are suitably connected or integral with the external control lines 26–29 in the catenary bundle. As illustrated in FIG. 4, the first ends of the ducts or internal conduits 153–156 are located at surface 147 by means of ports 149–152 and their second ends are coupled to the external control lines 26–29.

On stinger 34, spaced above surface 147 is an annular upwardly facing curved camming surface 158 that extends completely around the stinger, has one side higher than the other and has a vertically oriented slot 159 extending downwardly from the lower side. This slot has a rectangular cross-section and can receive locator key 123 in the first connector member and does so as the stinger 34 is moved upwardly into the annular member 100 as the bottom of the locator key 123 slids along camming surface 158. As this relative axial movement of the stinger 34 and annular member 100 takes place, as the second connector member 12 is moved axially towards the first connector member 11, the second connector member 12 will rotate until locator key 123 is received in slot 159. This rotationally orients the first and second connector members so that the flowline conduits therein can mate in a fluid-flow relationship and so that ports 149–152 in a second member can mate in a fluid-flow relationship with ports 109–112 in the first connector member. Thus, surface 158 and slot 159 form a rotational orientation member on the second connector member.

As seen in FIG. 5, the upper part 161 of stinger 34 is cylindrical and has an outer diameter equal to the inner diameter of annular camming surface 158, with upper part 161 passing through cylindrical inner surface 107 of annular member 100. At the distal end of upper part 161 is an inwardly extending annular lifting groove 162 which is releasably engaged with coupling 36 located at the end of the wireline 31 as shown in FIGS. 1–3. By using this combination of the coupling 36 and groove 162, the wireline 31 can be releasably coupled to the stinger 34 and thus the second connector member 12. This coupling 36 is a conventional suitable releasable coupling device that can be remotely connected and disconnected or so actuated by a diver if necessary. In all events, the coupling 36 is small enough to pass through annular member 100.

OPERATION

In utilizing the connector 10 in accordance with the invention to couple a plurality of flowlines and control lines in a catenary bundle in fluid-flow relationship to a plurality of wellheads supported on the submerged structure, the two ends of the catenary bundle 18 are initially supported adjacent the surface of the body of water as illustrated in FIG. 1.

The wireline 31 is run from crane 32 on vessel 24 from the surface, through the hollow annular member 100 in the first connector member 11, which is rigidly coupled to the submerged structure 25, through the upright opening 42 in structure 25 and then to the end of the catenary bundle having the second connector member 12 coupled thereto.

The wireline 31 is then connected via coupling 36 and groove 162 to the stinger 34 and thus the second connector member 12 and bundle 18, at which time the catenary bundle has the end connected to the wireline lowered to a position underwater below the submerged structure as illustrated in FIG. 2. This lowering is accomplished by releasing pilot buoy 38 from the bundle or in any other suitable fashion, which could include lowering the end of the bundle carrying the second connector member 12 by means of an additional crane.

Next, the wireline 31 is hauled through the hollow annular member 100 upwardly towards the surface by means of crane 32 as seen in FIG. 2 which results in the stinger 34 entering annular member 100 as shown in FIG. 4. At this time, locator key 123 and camming surface 158 interact to rotationally orient the first and second connector members. When the locator key 123 is fully received at the bottom of slot 159, as shown in FIG. 5, relative axial movement of the first and second connector members ceases and the flowline conduits in the first and second members are in fluid-flow relationship as are the ports 149–152 in the second member with ports 109–112 in the first connector member, as shown in FIG. 5. In this position, surface 147 defining the hub is fully seated with the surface 104 forming the frustoconical socket.

At this time, camming ring 132 is hydraulically activated upwardly from a position shown in FIG. 4 to that shown in FIG. 5 so that the locking segments 134 are cammed radially inwardly into groove 78 on the first connector member. This rigidly connects the first and second connector members and therefore rigidly connects the end of the catenary bundle carrying the second connector member to the submerged structure. This rigid connection can be released by downward movement of the camming ring 132 to disconnect the first and second connecting members, when desired.

Once the first and second connector members are coupled as shown in FIG. 5, as well as in FIG. 3, coupling 36 on the wireline 31 can be released from the stinger 34 and the wireline hauled upwardly to the surface by crane 32. This leaves the first and second connector members coupled so that the flowlines and control lines in the catenary bundle are in a fluid-flow relationship with the wellheads 20–23 on the submerged structure 25, as shown in FIG. 6.

Thus, for example, there can be a fluid-flow connection between well 60 and a production facility on surface vessel 24 through riser 54, wellhead 22 (as seen in FIG. 1), external flowline 46, hub 91, internal flowline conduit 74 in the first connector member, internal flowline conduit 143 in the second connector member (as seen in FIG. 5), flowline 16 and mooring buoy 35 (as seen in FIG. 3) which is in fluid-flow relationship with such a production facility on the surface vessel.

Similarly, there is a fluid-flow relationship along the control lines from the surface vessel 24 to the wellheads to control the operation, for example, of various valves on the wellheads. Thus, for example, there is a fluid-flow connection between wellhead 22 and the surface vessel 24 via control line 50 (as seen in FIGS. 5 and 6), duct 115, port 111 in surface 104, port 151 in surface 145, duct 155, control line 28 (as seen in FIG. 5), the catenary bundle 18 carrying control line 28, and mooring buoy 35 which is in fluid-flow connection with such a production facility on the surface vessel.

While one advantageous embodiment has been chosen to illustrate the invention, it will be understood by those skilled in the art that various changes and modifications can be made therein without departing from the scope of the invention as defined in the appended claims. For example, the location of the hub and socket on the first and second connector members can be reversed and more or less than the four wells, flowlines and control lines illustrated herein can be utilized. In addition, more than one control line per wellhead can be used as necessary. While the submerged structure 25 has been described as being buoyant, the connector 10 could be used with a submerged structure that is not necessarily buoyant but would be rigidly secured on the bed of the body of water. Finally, while various parts of the invention have been illustrated in the drawings as being integrally formed with one another, they could be separately formed and conventionally releasably coupled for ease of manufacture and assembly as desired.

What is claimed is:

1. A connector for coupling a plurality of flowlines in a catenary bundle in fluid-flow relationship with a plurality of wellheads supported on a submerged support, the combination comprising:
a first connector member rigidly coupled in an upright position to the submerged support and including
   a plurality of conduits extending therethrough having first and second ends, said conduits being coupled at their first ends to the plurality of wellheads, and
   an upright, hollow annular member having a first upwardly-facing open end and a second downwardly-facing open end and an orientation member on the interior thereof;
a second connector member adapted to be coupled to said first connector member and including
   a plurality of conduits extending therethrough and having first and second ends, said conduits adapted to be coupled at their first ends to the second ends of said conduits in said first connector member and being coupled at their second ends to the plurality of flowlines in the catenary bundle, and
   an elongated stinger adapted to be received in said hollow annular member via said second downwardly-facing open end and having an orientation member on the exterior thereof for mating with said orientation member on said first connector member to orient said conduits on said first and second connector members into a fluid-flow relationship;
a wireline extending through said hollow annular member in said first connector member and coupled to said stinger in said second connector member;
a hauling device coupled to said wireline for hauling said wireline upwardly towards the surface of the body of water so that said stinger is received in said annular member, so that said orientation members mate and so that said conduits on said first and second connector members are in a fluid-flow relationship; and
means for coupling said first and second connector members together when said conduits are in fluid-flow relationship.

2. A connector according to claim 1, wherein
said hollow annular member in said first connector member includes a downwardly facing, upwardly and inwardly tapering frustoconical socket, and
said stinger in said second connector member includes an upwardly facing, upwardly and inwardly tapering frustoconical hub adapted to seat in said socket.

3. A connector according to claim 2, wherein
said hollow annular member in said first connector member has a plurality of ducts extending therethrough from the outer surface thereof to said frustoconical socket, and
said hub has a plurality of ducts extending from the outside thereof, through the interior thereof and communicating with the outside of said second connector member,
said ducts in said hub and said hollow annular member being in fluid-flow relationship upon orientation of said conduits in said first and second connector members.

4. A connector according to claim 3, wherein
said first connector member includes a plurality of control lines having first and second ends wherein said first ends are coupled to said plurality of wellheads on the submerged support and said second ends are coupled to said ducts in said hollow annular member, and
said second connector member includes a plurality of control lines extending therefrom to form a part of the catenary bundle and coupled to said ducts in said second connector member.

5. A connector according to claim 2, wherein
said socket is centrally located in said first connector member, and
said hub is centrally located in said second connector member.

6. A connector according to claim 1, wherein
said submerged support is buoyant.

7. A connector according to claim 1, wherein
said stinger has upper and lower ends with said orientation member thereof being located therebetween, and
said conduits in said second connector member are located below said stinger orientation member.

8. A connector for coupling a plurality of flowlines and control lines in fluid-flow relationship with a plurality of wellheads supported on a submerged support, the combination comprising:
a first connector member rigidly coupled in an upright position to the submerged support and including
a plurality of flowline and control line conduits extending therethrough having first and second ends, said conduits being coupled at their first ends to the plurality of wellheads, and
an upright, hollow annular member having a first upwardly-facing open end and a second downwardly-facing open end and an orientation member on the interior thereof;
a second connector member adapted to be coupled to said first connector member and including
a plurality of flowline and control line conduits extending therethrough and having first and second ends, said conduits adapted to be coupled at their first ends to the second ends of said flowline and control line conduits in said first connector member and being coupled at their second ends to the plurality of flowlines and control lines in the catenary bundle, and
an elongated stinger adapted to be received in said hollow annular member via said second downwardly-facing open end and having an orientation member on the exterior thereof for mating with said orientation member on said first connector member to orient said flowline and control line conduits on said first and second connector members into a fluid-flow relationship;
a wireline extending through said hollow annular member in said first connector member and coupled to said stinger in said second connector member;
a hauling device coupled to said wireline for hauling said wireline so that said stinger is received in said annular member, so that said orientation members mate and so that said conduits on said first and second connector members are in a fluid-flow relationship; and
means for coupling said first and second connector members together when said conduits are in fluid-flow relationship,
said first connector member having a surface where said second ends of said first connector member control line conduits are located,
said second connector member having a surface where said first ends of said second connector member control line conduits are located,
said surface on said first connector member adapted to seat against said surface on said second connector member when said control line conduits are in fluid-flow relationship.

9. A connector according to claim 8, wherein
said surface on said first connector member is located centrally of said first connector member, and
said surface on said second connector member is located centrally of said second connector member.

10. A connector according to claim 8, wherein
said control line conduits extend generally centrally through said first and second connector members.

11. A connector according to claim 10, wherein
said flowline conduits extend through said first and second connector members radially spaced outwardly from said control line conduits.

12. A connector according to claim 8, wherein
said submerged support is buoyant.

13. A connector according to claim 8, wherein
said surface on said first connector member is a frusto-conical socket, and
said surface on said second connector member is a frustoconical projecting hub.

14. A connector according to claim 8, wherein
said stinger has upper and lower ends with said orientation member thereof being located therebetween, and
said conduits in said second connector member are located below said stinger orientation member.

15. A method of coupling a plurality of flowlines in a catenary bundle in fluid-flow relationship to a plurality of wellheads supported on a submerged support, comprising the steps of
supporting both ends of the catenary flowline bundle adjacent the surface of the body of water,
running a wireline from the surface, through an upright opening in the submerged support and to one end of the catenary bundle,
connecting the wireline to the end of the catenary bundle,
lowering the end of the catenary bundle connected to the wireline to a position underwater directly below the submerged support, and
hauling the wireline upwardly through the opening and towards the surface to pull the end of the catenary bundle upwardly so that the end of the catenary bundle engages the submerged support and is in fluid-flow relationship with the plurality of wellheads.

16. A method according to claim 15, and further comprising the step of
rigidly connecting to the submerged support the end of the catenary bundle engaging the support.

17. A method according to claim 15, wherein
the submerged support is buoyant.

18. A method according to claim 15, wherein
the submerged support is located between the bed and surface of the body of water.

19. A method according to claim 15, wherein the hauling step includes
rotationally orienting the end of the catenary bundle relative to the opening in the submerged support.

20. A connector for coupling a plurality of flowlines in a catenary bundle in fluid-flow relationship with a plurality of wellheads supported on a submerged support, the combination comprising:
a first connector member rigidly coupled in an upright position to the submerged support and including
a plurality of conduits extending therethrough having first and second ends, said conduits being coupled at their first ends to the plurality of wellheads, and
an upright, hollow annular member having a first upwardly-facing open end and a second downwardly-facing open end and an orientation member thereon;
a second connector member adapted to be coupled to said first connector member and including
a plurality of conduits extending therethrough and having first and second ends, said conduits adapted to be coupled at their first ends to the second ends of said conduits in said first connector member and being coupled at their second ends to the plurality of flowlines in the catenary bundle, and an elongated stinger adapted to be received in said hollow annular member via said second downwardly-facing open end and having an orientation member thereon for mating with said orientation member on said first connector member to orient said conduits on said first and second connector members into a fluid-flow relationship;

a wireline extending through said hollow annular member in said first connector member, coupled to said stinger in said second connector member and coupled to a hauling device for hauling said wireline upwardly towards the surface of the body of water so that said stinger is received in said annular member, so that said orientation members mate and so that said conduits on said first and second connector members are in a fluid-flow relationship and said second connector member is engaged with the bottom of said first connector member; and means for coupling said first and second connector members together when said conduits are in fluid-flow relationship.

* * * * *